United States Patent [19]

Giebeler

[11] Patent Number: 4,776,825
[45] Date of Patent: Oct. 11, 1988

[54] DIFFERENTIAL TEMPERATURE MEASURING RADIOMETER

[75] Inventor: Robert Giebeler, Cupertino, Calif.

[73] Assignee: Beckman Instruments, Inc., Fullerton, Calif.

[21] Appl. No.: 53,182

[22] Filed: May 22, 1987

[51] Int. Cl.$^4$ .......................... G01D 1/10; G01J 5/06; G01J 5/12

[52] U.S. Cl. ...................................... 374/12; 250/352; 374/124; 374/129; 374/133; 366/142

[58] Field of Search ................ 374/10, 133, 126, 128, 374/135, 153, 129, 124, 12; 352/43; 250/352; 366/142

[56] References Cited

U.S. PATENT DOCUMENTS

| | | | |
|---|---|---|---|
| 2,785,860 | 3/1957 | Harrison et al. | 374/129 |
| 3,409,212 | 11/1968 | Durland et al. | 374/133 |
| 3,653,263 | 4/1972 | Poole et al. | 374/153 |
| 4,117,712 | 10/1978 | Hager, Jr. | 374/9 |
| 4,420,688 | 12/1983 | Le Bars | 250/352 X |
| 4,435,092 | 3/1984 | Iuchi | 374/124 X |
| 4,733,079 | 3/1988 | Adams et al. | 250/341 |

*Primary Examiner*—Daniel M. Yasich
*Attorney, Agent, or Firm*—William H. May; Paul R. Harder

[57] ABSTRACT

In a double thermal coupled radiometer for preferable use with a centrifuge, an improved radiometer configuration is disclosed. The isothermal radiometric system improved is of the double junction variety (preferably copper-constantan-copper) and includes a black body housing defining a central concavity. The central concavity has a black body disk at the bottom thereof. The disk is preferably suspended by a copper and a constantan wire with one junction formed on the surface of the disk and the other junction formed on the surface of the housing. The improvement includes a plurality of and preferably three annular baffles defining central, circular and preferably concentric opening. These baffles are lodged in the opening of the housing above the mounted radiometer disk. The annular baffles on the side towards the radiation sources are coated as a black body so as to increase the thermal coupling of the black body housing to the ambient being radiometically observed. The baffles on the side away from the radiation source and exposed to the radiometer disk are reflectively coated to decrease further any couple between the radiometer disk and the black body housing. The combination of the baffles and the disk combine to give the radiometer a small field of view which permits radiometric thermal measurement of a small solid angle and ignores the remainder of the environment. Preferred use of the radiometer in looking at a centrifuge rotor is disclosed.

4 Claims, 1 Drawing Sheet

U.S. Patent   Oct. 11, 1988   4,776,825
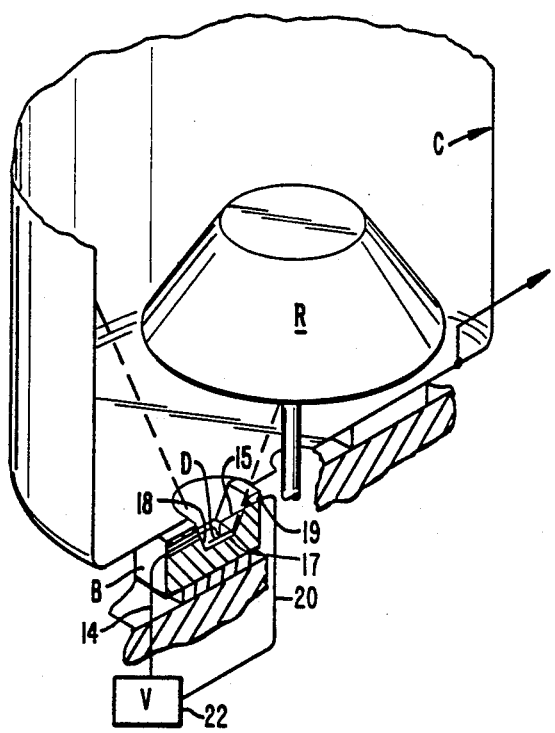
FIG._1.  PRIOR ART
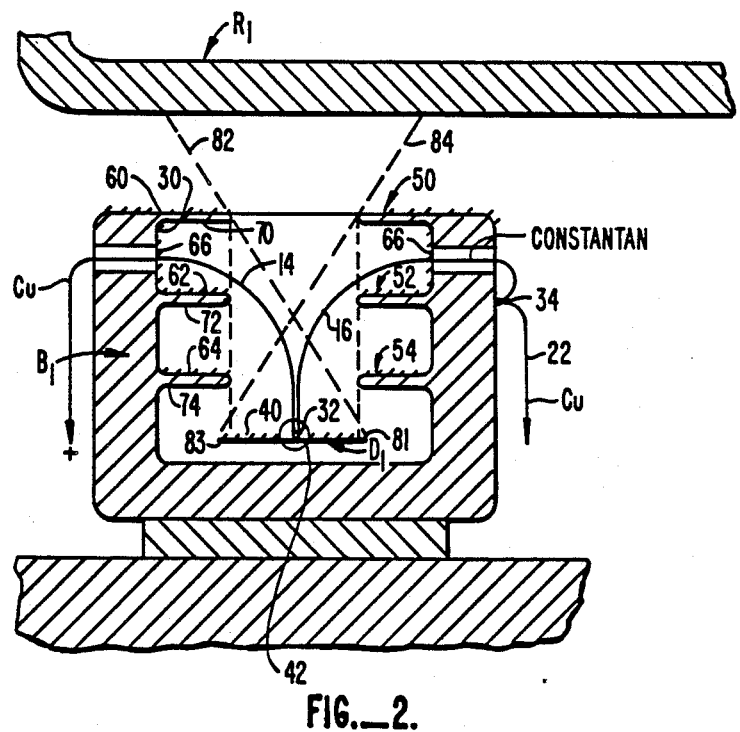
FIG._2.

DIFFERENTIAL TEMPERATURE MEASURING RADIOMETER

This invention relates to radiometers for measuring the infrared thermal emission of bodies. An improved radiometer is disclosed with baffles to increase the coupling of the housing to the environment, to decouple the temperature measuring disk from the housing and to restrict the solid angle of view.

SUMMARY OF THE PRIOR ART

Radiometers for use with centrifuges are known. Typically, such radiometers are isothermal radiometers having a black body housing with a temperature measuring disk. The black body housing is typically cylindrical in shape and defines a recessed cylindrical volume on the interior thereof. A suspended disk is mounted adjacent the bottom of the cylindrical opening in the black body housing. The disk is suspended and electrically communicated by a double bimetallic junction (preferably copper-constantan-copper. Wires form the double purpose of forming the electrical path to the junctions as well as mechanically suspending the disk of the radiometer. Temperature of a radiating body can be determined by having the radiometer pointed in the general direction of the object whose temperature is to be measured. In the case of a centrifuge this body is the rotor. See Durland et al. U.S. Pat. No. 3,409,212 issued Nov. 5, 1968.

SUMMARY OF THE INVENTION

In a double thermal coupled radiometer for preferable use with a centrifuge, an improved radiometer configuration is disclosed. The isothermal radiometric system improved is of the double bimetallic junction variety (preferably copper-constantan-copper) and includes a black body housing defining a central concavity. The central concavity has a black body disk at the bottom thereof. The disk is preferably suspended by a constantan and a copper wire with one junction formed on the surface of the disk and the other junction formed on the surface of the housing. The improvement includes a plurality of and preferably three annular baffles defining central, circular and preferably concentric opening. These baffles are lodged in the opening of the housing above the mounted radiometer disk. The annular baffles on the side towards the radiation source are coated as a black body so as to increase the thermal coupling of the black body housing to the ambient being radiometrically observed. The baffles on the side away from the radiation source and exposed to the radiometer disk are reflectively coated to decrease further any couple between the radiometer disk and the black body housing. The combination of the baffles and the disk combine to give the radiometer a small field of view which permits radiometric thermal measurement of a small solid angle and ignores the remainder of the environment. Preferred use of the radiometer in looking at a centrifuge rotor is disclosed.

BRIEF DESCRIPTION OF THE DRAWINGS

FIG. 1 is a view of a prior art radiometer; and

FIG. 2 is a plan view of the radiometer of this invention illustrating the attachment of the improved baffles and the restricted solid angle of view of the disclosed radiometer.

Referring to FIG. 1, an illustration of a prior art radiometer for use with a centrifuge is illustrated. A black body housing B is provided with a disk D. Disk D is mounted by a copper wire 14 and a constantan wire 14 into the interior of a conical cavity 18 in the black body B at a first junction 17. A second junction 19 terminates the constantan wire 15 and returns a constantan lead 20 to circuitry 22 for determining voltage error.

Operation and the deficiencies of the prior art radiometer in a centrifuge may be easily understood. Specifically, the disk D has a solid angle of view which is relatively wide with respect to the rotor R and can member C. Thus the radiometer will tend to view and measure the temperature of both the rotor R and can C.

Furthermore, it has been found that the side walls of the conical aperture 18 cause the disk D to be somewhat coupled to the temperature of the black body housing B. Preferably, disk D should be thermally independent of the black body housing B. An ideal state would be described if disk D coupled only to the rotor R.

Referring to FIG. 2, the invention herein set forth can now be discussed. A black body B1 is illustrated. The black body B1 defines a cylindrical opening 30.

Disk D1 is suspended. It is suspended by an copper wire 14, a constantan wire 16, the copper and constantan wires at their joinder form a bimetallic junction 32. Likewise, the opposite end of constantan wire 16 forms a bimetallic junction 34 from which copper wire 22 leads to circuitry (not shown). Junctions 32 and 34 indicate the temperature differential between the housing and the disk and are used and operate according to conventional teachings. (See e.g., U.S. Pat. No. 3,409,212 to Durland, et al.)

The disk D1 is constructed as in the prior art. Preferably it is coated on surface 40 as a black body. Thus, radiation will be absorbed at this surface. It is given a reflective coating at 42. This reflective coating will thermally decouple the disk D1 from the housing.

As distinguished from the prior art, three annular baffles 50, 52 and 54 are provided interior of the opening 30 in housing B1. These respective annular baffles serve to couple the black body housing B1 further to the environment, to decouple the disk D1 from the black body housing B1 and finally to provide disk D1 with a relatively small solid angle of view.

Regarding the coupling of the housing B1 to the environment, the upper surfaces 60 of the black body housing 62 of annular baffle 52 and 64 of annular baffle 54 are all coated as a black body. Thus, improved coupling of the black body B1 to the ambient is provided. It will be noted that in between annular baffle 50 and annular baffle 52, a black body coating 66 is provided. Again this coating provides coupling of the housing to the environment.

The undersurfaces 72 of annular baffle 52 and 74 of annular baffle 54 are given a reflective coating. This reflective coating prevents thermal transmission between the body B1 and disk D1. A decoupling of the disk D1 from the housing B1 results.

It will be realized that the radiometer as constructed is given a reduced solid angle of view. Referring to FIG. 2 and immediately overlying FIG. 2 is a schematic of the bottom of a rotor R1. It will be seen that edge 81 of disk D1 has a line of sight 82 to the periphery of the rotor only. Likewise, edge 83 of disk D1 has a line of sight 84 to the rotor R1. Lines 82, 84 define the maximum solid angle of disk D1 view of the rotor R1.

Those having ordinary skill in the art will understand that the view of the radiometer illustrated is not necessarily restricted to the solid angle defined by lines 82, 84. Nevertheless, the presence of the baffles 50, 52, 54 does impart to disk D1 and a smaller solid angle with the result that temperatures radiated are limited.

What is claimed is:

1. In a radiometer of the type having a black body housing, said housing defining side walls and a central cylindrical opening, a radiometer disk suspended in said black body housing at the bottom of said cylindrical opening for receiving radiation from a radiation source over an angle defined by said cylindrical opening, and at least two bimetallic junctions at said disk and at said housing and a second bimetallic junction at said housing for indicating the temperature differential of said disk from said housing, the improvement in said housing at the central cylindrical opening comprising:

at least one annular baffle mounted to said housing at said sidewalls and overlying said radiometer disk for defining an inner central opening, said annular baffle including an upwardly exposed black body surface facing said radiation source for absorbing incoming radiation thereon, said annular baffle including a downwardly exposed reflective surface facing said radiometer disk for thermally decoupling said radiometer disk from said annular baffle and housing; and said inner opening of said annular baffle in combination with said radiometer disk providing a reduced solid angle of view for said radiometer disk whereby said radiometer receives thermal radiation substantially from said source only.

2. The invention of claim 1, said at least one baffle including a plurality of annular baffles, each said baffle having the upper surface thereof coated as a black body and the lower surface reflectively coated with respect to thermal radiation.

3. The invention of claim 2 and including three annular baffles between said disk and the opening to said housing.

4. The invention of claim 3 and wherein a portion of said side walls have a black body surface between said annular baffles.

* * * * *